UNITED STATES PATENT OFFICE 2,306,830

ANTIOXIDANT

Philip T. Paul, Naugatuck, Conn., assignor to United States Rubber Company, New York, N. Y., a corporation of New Jersey No Drawing. Application November 15, 1940, Serial No. 365,757

11 Claims. (Cl. 260—802)

This invention relates to improvements in age resistors, and more particularly to a new class of anti-oxidants for rubber and other unsaturated organic materials.

An object of the invention is to provide a new class of anti-oxidants or age resistors for organic substances which tend to deteriorate by absorption of oxygen from the air, for example, goods of rubber or allied gums, polymerized olefines, polymerized halogenated olefines, unsaturated fatty oils such as unsaturated vegetable oils, essential oils, petroleum oils and their derivatives such as gasolines, soaps, aldehydes, synthetic resins, turpentine, paints and varnishes containing drying oil and the like. Further objects will be apparent from the following description.

According to the invention the organic substance is treated with the product of thermo reaction of a mixture of a ketone, an aliphatic alcohol, and a secondary di-aromatic amine. Such a product has properties unpossessed by the ketone-secondary di-aromatic amine condensation products, or the alcohol-secondary di-aromatic amine condensation products. For example, the present products are unexpectedly superior in retarding the deterioration of rubber due to flexing. The products are viscous or syrupy to resinous and are at present of unknown composition. I have further discovered that the alcohol-ketone-diarylamine reaction runs a different course than either the ketone-diarylamine reaction or the alcohol-diarylamine reaction. Table I shows reactions run for 15 hours at 250° C. in a sealed tube.

Table I

| Chemical | Reactants | | | | Percent nitrogen in reaction product |
|---|---|---|---|---|---|
| | Diphenylamine | Acetone | Isopropanol | HI (d=1.7) | |
| | Gr. | Cc. | Cc. | Cc. | |
| A | 33.8 | 30 | | 1 | 6.60 |
| B | 33.8 | 21 | 9 | 1 | 5.48 |
| C | 33.8 | 18 | 12 | 1 | 5.67 |
| D | 33.8 | 15 | 15 | 1 | 5.70 |
| E | 33.8 | 10 | 20 | 1 | 5.94 |
| F | 33.8 | | 30 | 1 | 6.62 |

If the acetone-diphenylamine and isopropanol-diphenylamine reactions had been independent the nitrogen analysis would have remained constant at about 6.6.

The amines employed in the preparation of the antioxidants are secondary di-aromatic amines of the type

wherein Ar represents an aromatic nucleus. The aromatic nucleus may be substituted by alkyl, aryl, alkoxy, anilino, hydroxy etc. or it may consist of fused rings such as in naphthalene. Typical compounds include diphenylamine, the ditolylamines, the dixenylamines, phenyl tolylamines, the phenyl naphthylamines, etc.; more specifically di-o-tolylamine, di-p-tolylamine, di-m-tolylamine, phenyl p-xenylamine, phenyl o-xenylamine, phenyl alpha-naphthylamine, phenyl B-naphthylamine, 4-hydroxy diphenylamine, 4-anilino diphenylamine, 4-ethoxy diphenylamine, 4-methyl phenylamino-diphenylamine.

The alcohols suitable for this invention are acyclic, alicyclic or aralkyl alcohols such as methanol, ethanol, the butanols, the pentanols, allyl alcohol, cyclohexanol, benzyl alcohol, etc.; more specifically n-butanol, sec.-butanol, iso-butanol, tert.-butanol, n-pentanol, sec.-pentanol, iso-pentanol, tert.-pentanol, allyl alcohol, cyclohexanol, benzyl alcohol.

Among the examples of suitable ketones are the following: acetone, methyl ethyl ketone, methyl amyl ketone, cyclohexanone, diethyl ketone, acetophenone, and the like. In general, acetone is the preferred ketone because of its cheapness and relative speed of reaction.

A large variety of catalysts may be employed provided they are acids or are capable of generating acids under the conditions of the reaction. Such catalysts are the halogens or their salts with metals such as iron, zinc, cadmium, ammonia, etc. The halogen acids or sulfuric or phosphoric acids are also usable.

In general, I prefer to use an amount of ketone and alcohol such that the combined molage is greater compared to the amine; the ketone or alcohol can be in excess compared to the amine. Usually the total ketone and alcohol molage will be on the order of two mols to one mol of the amine, although variations from this ratio may be made without departing from the spirit of the invention. Furthermore, the mol ratio of the alcohol and ketone may be varied depending upon the particular alcohol and ketone used.

The reaction may be carried out at the reflux temperatures of the alcohol-ketone mixture (60° C. and up), or under autoclavic conditions at temperatures in the neighborhood of 250° C. Intermediate reaction temperatures may be conveniently obtained by passing a mixture of the vapors of the alcohol and ketone through the molten amine. Water is eliminated during the reaction.

The following examples illustrate the invention but it is to be understood that any of the above mentioned materials may be employed with suitable changes in concentration, catalyst, and reaction time.

EXAMPLE I.—*Acetone-isopropanol-diphenylamine*

A series of reaction mixtures corresponding to those for chemicals A, D and F of Table I, using hydriodic acid (density 1.7) as a catalyst, was heated 15 hours in sealed tubes at temperatures ranging from 230–250° C.

Each product was purified by dissolving in benzene, washing with dilute alkali and then with water until neutral. The benzene was removed by distillation under reduced pressure.

Table II

| Chemical | Reactants | | | |
|---|---|---|---|---|
| | Diphenyl-amine | Acetone | Isopropanol | HI |
| | Gr. | Cc. | Cc. | Cc. |
| A | 33.8 | 30 | | 1 |
| D | 33.8 | 15 | 15 | 1 |
| F | 33.8 | | 30 | 1 |

The products were tested in a tread stock consisting of (the parts are by weight):

| | |
|---|---|
| Smoked sheet | 100 |
| Carbon black | 45 |
| Zinc oxide | 5 |
| Pine tar | 3.5 |
| Zinc soap cocoanut oil fatty acids | 3.5 |
| Sulfur | 3.0 |
| Mercaptobenzothiazole | 1.0 |

The materials were incorporated in the ratio of 1.0 part to 100 parts of rubber. Cures were made for 45, 60, 75 and 90 minutes at 30 pounds steam. Suitable test pieces were cut and tested on the De Matta flexing machine. The results expressed as kilocycles to the end point are as follows:

| Chemical | A | D | F | Control |
|---|---|---|---|---|
| Kilocycles to end point | 143 | 160 | 115 | 100 |

EXAMPLE II.—*Acetone-tertiary pentanol-diphenylamine*

A series of reaction mixtures of acetone, tertiary pentanol, and diphenylamine using hydriodic acid (density 1.7) as a catalyst was heated 15 hours in sealed tubes at temperature ranging from 230 to 250° C. The products were worked up as described in Example I.

Table III

| Chemical | Reactants | | | |
|---|---|---|---|---|
| | Diphenyl-amine | Acetone | t. Pentanol | HI |
| | Gr. | Cc. | Cc. | Cc. |
| A | 33.8 | 30 | | 1 |
| B' | 33.8 | 15 | 15 | 1 |
| C | 33.8 | | 30 | 1 |

The materials were tested in the proportion of 1.0 part on 100 parts of rubber in the rubber mix of Example I. Test pieces were cut and tested on the De Matta flexing machine. Results, expressed in kilocycles to the end point are as follows:

| Chemical | A | B' | C | Control |
|---|---|---|---|---|
| Kilocycles to end point | 182 | 197 | 172 | 100 |

EXAMPLE III.—*Acetone-tertiary butanol-diphenylamine*

A series of reaction mixtures of acetone, tertiary butanol, and diphenylamine using hydriodic acid (density 1.7) as a catalyst was heated 15 hours in sealed tubes at temperatures ranging from 230 to 250° C. and the products worked up as described in Example I.

Table IV

| Chemical | Reactants | | | |
|---|---|---|---|---|
| | Diphenyl-amine | Acetone | t. Butanol | HI |
| | Gr. | Cc. | Cc. | Cc. |
| A | 33.8 | 30 | | 1 |
| B'' | 33.8 | 15 | 15 | 1 |
| C | 33.8 | | 30 | 1 |

When incorporated in the ratio of 1.0 part on 100 parts of rubber in the above rubber mix and tested on the De Mattia flexing machine the results were as follows:

| Chemical | A | B'' | C | Control |
|---|---|---|---|---|
| Kilocycles to end point | 179 | 188 | 175 | 100 |

The invention may be applied to the preservation of natural as well as artificially-prepared rubber compositions, including reclaims and latices of such rubber compositions. The materials may be treated in solid form or when in the form of dispersions or solutions.

It is to be understood that other desired filling and compounding ingredients may be incorporated along with the anti-oxidants, for example in the case of rubber, there may be incorporated other accelerators, softeners, etc.

The anti-oxidant may be incorporated in any type of rubber composition, such as those used for automobile tires, tubes, hose, belting, sheet and thread rubber, rubberized fabrics, molded goods, boots and shoes, etc. whether vulcanized in the mold, in open steam, in hot air, or in the cold by the so-called acid process. The proportion of anti-oxidant may vary from 0.1% to 5% although either smaller or greater proportions may be found useful. If the material to which it is added is a liquid such as rubber cement or an oil, the anti-oxidant may be dissolved therein in a suitable small proportion. The antioxidant may be incorporated into solid substances by milling or mastication, and when prepared for incorporation into dispersions or solutions either in powder, paste, or solution form, or applied in such forms for incorporation by diffusion, to the surfaces of vulcanized or unvulcanized rubber goods.

Having thus described my invention, what I claim and desire to protect by Letters Patent is:

1. A method of inhibiting the deterioration of organic substances which tend to deteriorate by absorption of oxygen from the air which comprises incorporating therein a product of thermal reaction of a ketone, a hydrocarbon alcohol, and a secondary di-aromatic amine in the presence of an acidic catalyst with elimination of water.

2. A method of inhibiting the deterioration of organic substances which tend to deteriorate by absorption of oxygen from the air which comprises incorporating therein a product of thermal reaction of an aliphatic ketone, an aliphatic hydrocarbon alcohol, and a secondary di-aromatic amine in the presence of an acidic catalyst with elimination of water.

3. A method of inhibiting the deterioration of organic substances which tend to deteriorate by absorption or oxygen from the air which comprises incorporating therein a product of thermal reaction of a dialkyl ketone, an aliphatic hydrocarbon alcohol, and a diarylamine in the presence of an acidic catalyst with elimination of water.

4. A method of inhibiting the deterioration of organic substances which tend to deteriorate by absorption of oxygen from the air which comprises incorporating therein a product of thermal reaction of acetone, an open chain aliphatic hydrocarbon alcohol, and a diarylamine in the presence of an acidic catalyst with elimination of water.

5. A method of preserving rubber which comprises incorporationg therein a product of thermal reaction of a ketone, an aliphatic hydrocarbon alcohol, and a secondary di-aromatic amine in the presence of an acidic catalyst with elimination of water.

6. A method of preserving rubber which comprises incorporating therein a product resulting from heating together with elimination of water an aliphatic ketone, an aliphatic hydrocarbon alcohol, and a diarylamine, in the presence of an acidic reaction catalyst.

7. A method of preserving rubber which comprises incorporating therein a substantially neutral product of thermal reaction of acetone, an aliphatic monohydric hydrocarbon alcohol, and a diarylamine in the presence of an acidic catalyst with elimination of water.

8. A method of preserving rubber which comprises incorporating therein a substantially neutral product of thermal reaction of acetone, an aliphatic monohydric hydrocarbon alcohol, and a diphenylamine in the presence of an acidic catalyst with elimination of water.

9. A method of preserving rubber which comprises incorporating therein a substantially neutral product of thermal reaction of acetone, an aliphatic monohydric hydrocarbon alcohol, and phenyl beta naphthylamine in the presence of an acidic catalyst with elimination of water.

10. An organic substance which tends to deteriorate by absorption of oxygen from the air containing a product of thermal reaction of a ketone, an aliphatic hydrocarbon alcohol, and a secondary di-aromatic amine in the presence of an acidic catalyst with elimination of water.

11. A vulcanization product of rubber containing a product of thermal reaction of a ketone, an aliphatic hydrocarbon alcohol, and a secondary di-aromatic amine in the presence of an acidic catalyst with elimination of water.

PHILIP T. PAUL.